E. T. LAMMINE.
WELDED WROUGHT IRON ANNEALING POT.
APPLICATION FILED NOV. 4, 1908.

1,014,491.

Patented Jan. 9, 1912.

Witnesses

Inventor

UNITED STATES PATENT OFFICE.

EMIL THEODOR LAMMINE, OF MÜLHEIM-ON-THE-RHINE, GERMANY.

WELDED WROUGHT-IRON ANNEALING-POT.

1,014,491. Specification of Letters Patent. Patented Jan. 9, 1912.

Application filed November 4, 1908. Serial No. 461,054.

*To all whom it may concern:*

Be it known that I, EMIL THEODOR LAMMINE, a subject of the German Emperor, and resident of Mülheim-on-the-Rhine, Germany, have invented an Improvement in Welded Wrought-Iron Annealing-Pots, of which the following is a specification.

The subject-matter of the present invention is a special improvement in welded wrought iron annealing pots and comprises particularly a peculiar manner of fluting or corrugating the walls of the pot in relation to its ends.

Figure 1:
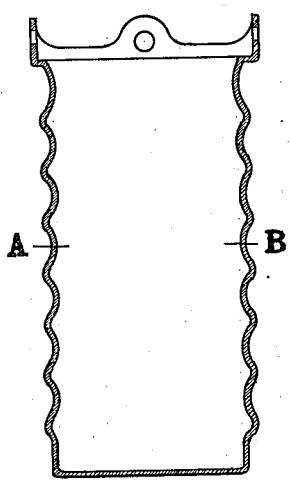
Figure 2:
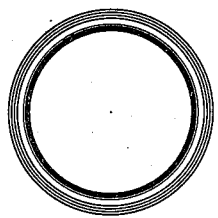
Figure 3:
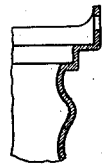
Figure 4:
Figure 6:
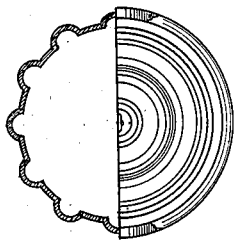
Figure 5:
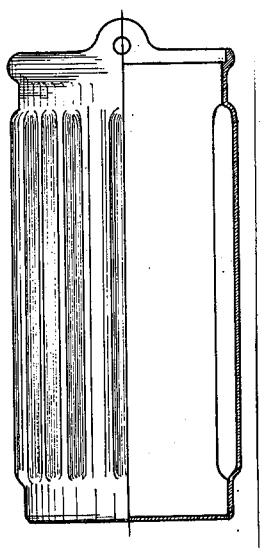

In the accompanying drawings, Figure 1 is a vertical sectional view through the center of an annealing pot embodying the invention; Fig. 2 is a horizontal section on the line A—B of Fig. 1; Fig. 3 is a fragmentary sectional view of the open end portion of the pot; Fig. 4 illustrates the form of cover preferably employed for the pot; Fig. 5 is a view partly in section and partly in elevation of a modification of the invention wherein the ribs or corrugations are longitudinal or vertical; Fig. 6 is a plan view of the modification shown in Fig. 5.

By the employment of corrugations or ribs on the walls of the pot, the strength of the receptacle is necessarily materially increased and thinner metal may be used aside from the advantageous fact that a more effective annealing surface is obtained. Other advantages of the type of pot described, wherein, as shown in Fig. 1 of the drawings, the corrugations are provided annularly, are that it lasts longer and that its weight is less. The corrugations or flutings of the walls of the receptacle may be parallel or at a right angle to the longitudinal axis thereof and the longitudinal arrangement of the corrugations is shown in Fig. 5.

The cover employed in connection with the pot shown in Fig. 4 is reinforced by concentric rings, rendering it much stiffer than a light cover and eliminating likelihood of warping and loss of proper shape. Furthermore, the concentric rings or flutings of the cover limit the expansion at the periphery, and likelihood of the walls of the pot being thrown out of shape by such expansion is prevented.

It is found that, by using a pot of the peculiar form shown in the drawings, there is less expansion of the body of the receptacle in use than incidental to the employment of the smooth walled variety.

The peculiar construction of the annealing pot wherein the corrugations of the body terminate a short distance from each end, is especially advantageous by reason of the fact that any tendency of the body to buckle or become distorted is confined to the corrugated portion intermediate the opposite extremities of the pot. In other words, the distortion of the end portions of the body is minimized materially by the above structure, and the likelihood of the open end of the receptacle, which carries the lid, becoming distorted or mis-shapen, is reduced to the greatest possible extent. By the above described formation of the body of the annealing pot, the life of the receptacle is prolonged, for the corrugations on the body rigidify the same for obvious reasons, and the reduction of the buckling or distortion tendencies affords clear advantages under practical conditions of service, and especially with reference to the lid supporting the end of the pot. Furthermore, the flange formed at the mouth or open end of the pot constitutes a virtual reinforcing corrugation, increasing the substantiality of the open end of the receptacle, in addition to forming the seat for the lid.

Having thus described the invention, what is claimed as new is:

An annealing pot comprising a body formed with corrugations terminating a short distance from each end thereof, one end of the body being open and provided with an integral flange reinforcing the body at its open end and forming a seat for the lid.

In testimony whereof I have hereunto set my hand in the presence of two subscribing witnesses.

EMIL THEODOR LAMMINE.

Witnesses:
OSWALD MEINECKE,
LOUIS VANDORN.